Figure 1:
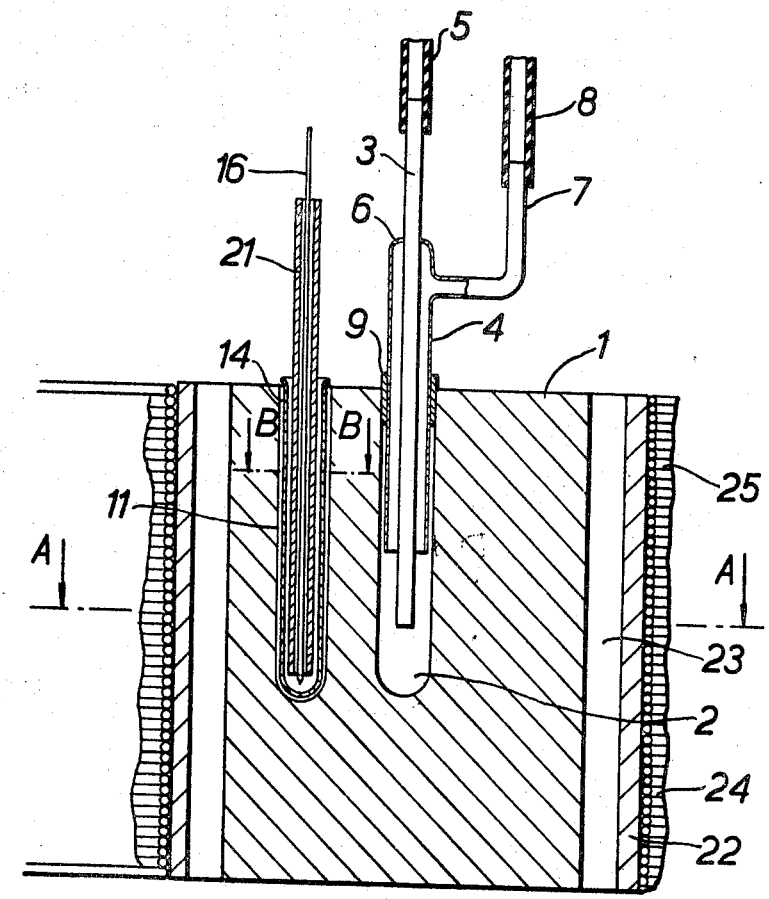

United States Patent

[11] 3,572,084

| [72] | Inventor | Ivor Clifford Herbert May<br>Banstead Surrey, England |
| --- | --- | --- |
| [21] | Appl. No. | 792,708 |
| [22] | Filed | Jan. 21, 1969 |
| [45] | Patented | Mar. 23, 1971 |
| [73] | Assignee | BP Chemicals (U.K.) Limited<br>London, England |
| [32] | Priority | Jan. 25, 1968 |
| [33] | | Great Britain |
| [31] | | 3906/68 |

[54] APPARATUS FOR DIFFERENTIAL THERMAL ANALYSIS
6 Claims, 3 Drawing Figs.

| [52] | U.S. Cl. | 73/15 |
| --- | --- | --- |
| [51] | Int. Cl. | G01n 25/00 |
| [50] | Field of Search | 73/15 |

[56] References Cited
UNITED STATES PATENTS

| 3,283,560 | 11/1966 | Harden et al. | 73/15 |
| --- | --- | --- | --- |
| 3,456,490 | 7/1969 | Stone | 73/15 |

*Primary Examiner*—James J. Gill
*Assistant Examiner*—Herbert Goldstein
*Attorney*—Jacobs and Jacobs ABSTRACT: Apparatus for low temperature differential thermal analysis wherein cooling of the sample block is carried out by means of a liquefied gas fed in the form of discrete slugs through small-bore plastics tubing, to a cavity in the block.

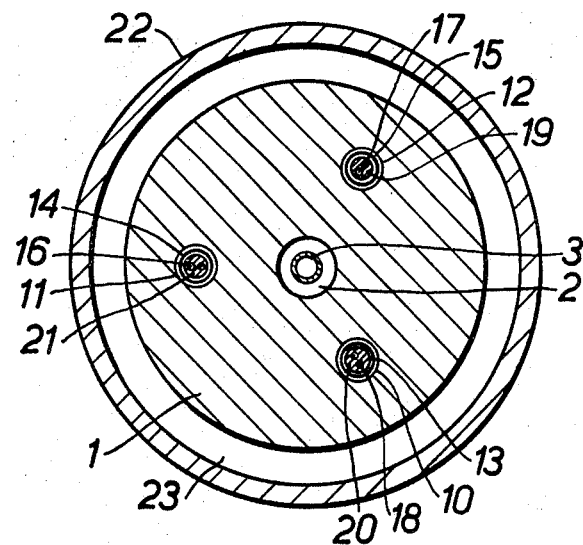
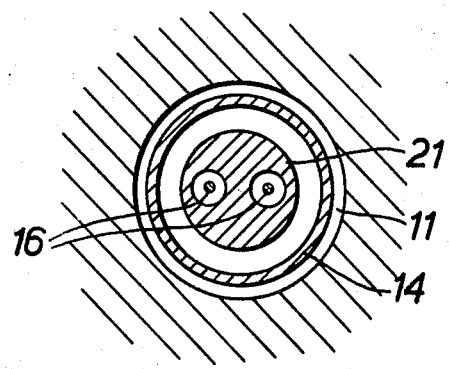

APPARATUS FOR DIFFERENTIAL THERMAL ANALYSIS

This invention relates to new apparatus for differential thermal analysis.

Differential thermal analysis is the technique of measuring the heat effects associated with physical or chemical changes that take place as a substance is heated or cooled at a uniform rate. The sample to be investigated is heated (or cooled) at the same rate as a thermally inert sample, and the temperature difference between them, as detected for instance by two thermocouples, is recorded as a function of time (or of the temperature of either sample). If the sample thermocouple becomes cooler than the reference thermocouple, a peak in one direction will be obtained on the recorder; if it becomes hotter, there will be a peak in the opposite direction. The differential thermal analysis results give information on the energy changes associated with physical and chemical changes in the material under test.

It is known that liquefied gases, particularly nitrogen, can be used to cool the sample blocks of differential thermal analysis equipment. This has previously been achieved by flooding these blocks externally with the liquefied gas, or by passing liquid or gaseous nitrogen through a coil or jacket surrounding the block.

According to the present invention, apparatus for differential thermal analysis comprises a thermally conductive differential thermal analysis block having a central cavity adapted to be cooled by discrete slugs of a liquefied gas.

The cooling system used in the apparatus of the present invention is a method of cooling using a liquefied gas, wherein a sealed liquefied gas reservoir equipped with a dip tube is connected to a sealed cavity in the object to be cooled, said cavity being equipped with a vent tube with a fine control valve attached, by means of a length of tubing having a bore sufficiently small to enable liquefied gas to flow through in discrete slugs, the thickness and thermal conductivity of the tubing wall being such that the heat transfer from ambient atmosphere to the bore wall causes the liquefied gas slug to vaporize where it contacts the wall, thus enabling the slug to pass through the tube on a cushion of gas. Little heat is required to effect the vaporization and thus the tubing should be made from material having some heat insulating power.

In particular, apparatus for differential thermal analysis according to the present invention comprises a cylindrical block of thermally conductive material having a longitudinal central cylindrical cavity extending axially from one end of the block into but not through the block, means for introducing a liquefied gas into the central cavity comprising two concentric tubes mounted in the cavity by means of a gastight seal both tubes being open at the ends inside the cavity, the inner tube extending further into the cavity than the outer tube and being adapted to be connected at its outer end by means of flexible small bore plastics tubing to a sealed reservoir of liquefied gas and the outer tube being adapted to be connected at its outer end by means of flexible small bore plastics tubing to a valve, three longitudinal cavities spaced radially and symmetrically around the central cavity and extending from the same end of the block as the central cavity into but not through the block, and means for measuring the temperature in each of the three radially disposed cavities.

In order to describe the invention more clearly, one form of apparatus according to the present invention is shown in the accompanying diagrammatic drawings. FIG. 1 shows a vertical cross section of the apparatus, FIG. 2 shows a cross section along the line AA (with the heating coil and insulating material omitted) and FIG. 3 shows a cross section of the cavity 11 along the line BB. The apparatus comprises a cylindrical block 1 of a thermally conductive material, examples of suitable materials being aluminum, aluminum alloys, nickel, nickel alloys, stainless steel, copper, copper alloys, silver and other metals and ceramic materials. The block has a longitudinal central cavity 2 extending axially from one end into but not through the block containing means for introducing liquid nitrogen or other suitable liquefied gas into the cavity, comprising two concentric metal tubes 3 and 4 suitably constructed from stainless steel or other suitable material, the inner tube 3 extending further into the block than the outer one 4 and being connected to a sealed liquid nitrogen reservoir (not shown) fitted with a neck for filling, the neck carrying a screw fitting concentive pair of adjustable pressure spring-loaded gas release valves and equipped with a siphon tube by means of flexible, small-bore, plastic tubing 5. The preferred tubing is transparent PVC having a bore of approximately 2 mm. with a 1 mm. wall thickness. The outer tube is sealed to the inner tube at its upper end 6 and is fitted with a side arm 7 connected to a suitable needle valve (not shown) or other suitable fine flow controller by means of the flexible small-bore plastic tubing 8.

The outer tube is sealed into the cavity by means of a gasket 9, preferably a tapered and ribbed, drilled sleeve of PTFE or a heat-resisting mineral or metal so that the seal is gastight up to a predetermined pressure. The free space in the control cavity may optionally be loosely packed with quartz wool or other suitable material. Three longitudinal cavities of equal length 10, 11 and 12, are spaced radially around the central cavity, equidistant from it at 120° intervals, extending axially from one end into but not through the block, and preferably being equal in length to the central cavity. These radially disposed cavities 10, 11 and 12 contain thin glass sample tubes, 13, 14 and 15, one of which is used to contain the material under investigation and the second is used to contain a suitable amount of a reference material. The third may also contain the reference material in order to provide similar thermal contact for a thermocouple to measure the block temperature. Extending down into three tubes 13, 14 and 15 are similar matched thermocouples 16, 17 and 18, preferably being conical spear tipped thermocouples such as chromel/alumel. The thermocouples, which are encased in twin-bore ceramic tubes 19, 20 and 21 which may be sleeved with ceramic sleeves (not shown) in order that they are close fits within the sample tubes, are used to measure the temperatures of the two samples and the block; two thermocouples, measuring sample temperature and differential temperature, being connected to a suitable differential thermal analysis amplification and recording device.

The block assembly is surrounded by a cylindrical metal sleeve 22 whose internal diameter is larger than the external diameter of the block, so that there is a small, e.g. 1 mm. annular space 23 between the block and the cylinder. Around the outside of the cylindrical metal sleeve is an insulated cylindrical heating coil 24, suitable constructed to slide fit over the sleeve. The coil is connected to a suitable controlled electrical supply; the heating coil being covered with a lagging cement 25. The whole unit is placed in a stainless steel "Dewar" flask, the free space in the "Dewar" flask being filled with a suitable insulating material, for example, quartz wool.

In operation of the apparatus the rate of flow of liquid nitrogen into the central cavity of the block for cooling purposes is controlled by the reservoir valves and by the valve on the outer vent tube. When the latter valve is open, the pressure differential between the sealed liquid nitrogen reservoir and the central cavity, which is normally created and maintained by a small heat leakage from the ambient atmosphere and the small bore plastic tubing into the gas reservoir, causes liquid nitrogen to flow in the form of "slugs" of liquid lubricated by nitrogen gas, through the small-bore plastic tube, into the central cavity via the inner tube. By closing the control valve, the pressure differential is decreased, thereby decreasing the rate of flow of liquid nitrogen "slugs" and therefore the rate of cooling is decreased. Approximately linear cooling can be obtained by simply throttling the liquid nitrogen feed as described, without employing the counteracting heating coil. By automatically opposing the cooling effect of the liquid nitrogen with the heating coil, using the third thermocouple as a temperature sensor, controlling, via a closed loop system the power output from a cam driven or solid state stepless proportional power controller, the rate of cooling and heating the block to and from low temperatures can be controlled to a fine degree, enabling differential thermal analysis to be carried out either when cooling or heating the sample. Linear cooling can be achieved from above ambient temperature, for example from any temperature below 500° C by starting the coolant flow at a rate sufficient to overcool the block and then opposing this overcooling by means of automatic control on the heating coil. This method is an improvement over previously used systems which have uncorrected exponential cooling depending on the rate of heat loss of the apparatus to the atmosphere. The annular space between the block and the heating jacket inner wall can be filled with sliding fit interchangeable cylinders of the same material as the block and heater cylinder or a material of a different thermal conductivity, or the space may be left empty. The whole apparatus is encased in a gastight jacket, suitably made from borosilicate glass and externally screened with a sheet metal cylinder (ground connected), the electrical leads and gas tubes being led out through suitable seals, valves and stopcock enabling the differential thermal analysis to be carried out under controlled conditions, for example, at reduced or increased pressure or in static or dynamic gas flows. This has the further advantage in that any gases or vapors evolved by the sample during the course of the analysis may be collected and analyzed.

All the heating leads and thermocouple leads and casings are preferably metal screened and grounded. All metal components of the apparatus, for example, the block and its sheathing cylinders, the stainless steel "Dewar" vessel and the external metal cylinder are preferably grounded. These precautions prevent induction effects and ensure a steady "-noise free" base line $\Delta T$ trace on the recorder.

The apparatus of the present invention can be used for differential thermal analysis over a wide range of temperatures, the lower limit being dependent on the liquefied gas used, and the upper limit being dependent on the material used in the construction of the block and the heating coil, for example, by using nitrogen and an aluminum/silicon alloy block, a controlled operating temperature range from $-196°$ C to $+500°$ in either direction may be obtained.

I claim:

1. Apparatus for differential thermal analysis, which comprises a cylindrical block of thermally conductive material having a longitudinal central cylindrical cavity extending axially from one end of the block into but not through the block, means for introducing discrete slugs of a liquified gas into the central cavity comprising two concentric tubes mounted in the cavity by means of a gastight seal, both tubes being open at the ends inside the cavity, the inner tube extending further into the cavity than the outer tube and being connected at its outer end by means of small bore heat-insulating tubing to a sealed reservoir of liquified gas and the outer tube being connected at its outer end by means of small bore tubing to a vent valve, a plurality of longitudinal cavities around the central cavity and extending from the same end of the block as the central cavity into but not through the block, and means for measuring the temperature in each of the radially disposed cavities.

2. Apparatus for differential thermal analysis, which comprises a block of thermally conductive material having a longitudinal central cavity extending axially from one end of the block into but not through the block; a sealed reservoir for liquified gas having an outlet and a valve in said outlet for controlling flow of liquified gas out of said reservoir; means for introducing discrete slugs of a liquified gas into the central cavity comprising two concentric tubes mounted in the cavity by means of a gastight seal, both tubes being open at the ends inside the cavity, the inner tube extending further into the cavity than the outer tube, flexible small bore heat-insulating tubing connecting said reservoir outlet valve and said outer end of said inner tube and providing a path for flow of liquified gas from said reservoir to said central cavity through said inner tube, the thickness and thermal conductivity of the tubing wall being such that the heat transfer from ambient atmosphere to the bore wall causes partial vaporization of liquified gas passing therethrough, and a vent valve for controlling flow of vaporized liquified gas from said central cavity through said outer tube, said vent valve being connected to the outer end of the outer tube by flexible small bore heat-insulating tubing, whereby closing or opening of said vent valve decreases or increases, respectively, the pressure differential between the sealed reservoir and the central cavity; a plurality of longitudinal cavities around the central cavity and extending from the same end of the block as the central cavity into but not through the block; and means for measuring the temperature in each of the radially disposed cavities.

3. Apparatus according to claim 2, wherein said small bore tubing has a bore of about 2 mm., a wall thickness of about 1 mm. and is made of polyvinyl chloride.

4. Apparatus according to claim 2, including means for heating said block.

5. Apparatus according to claim 4, wherein said small bore tubing has a bore of about 2 mm., a wall thickness of about 1 mm. and is made of polyvinyl chloride.

6. Apparatus according to claim 5, wherein said block is a cylindrical block, said central cavity is a cylindrical cavity, and three longitudinal cavities are provided symmetrically disposed around said central cavity.